(12) United States Patent
DeJule et al.

(10) Patent No.: US 6,172,371 B1
(45) Date of Patent: Jan. 9, 2001

(54) ROBUST COVER PLATE FOR RADIATION IMAGER

(75) Inventors: Michael Clement DeJule, Clifton Park; Stanley Joseph Lubowski, Scotia, both of NY (US)

(73) Assignee: General Electric Company, Schenectady, NY (US)

( * ) Notice: Under 35 U.S.C. 154(b), the term of this patent shall be extended for 0 days.

(21) Appl. No.: 09/097,165

(22) Filed: Jun. 15, 1998

(51) Int. Cl.⁷ ................................. G01T 7/00; G01T 1/20
(52) U.S. Cl. ...................... 250/370.11; 250/361 R; 250/363.02
(58) Field of Search .................... 250/361 R, 363.02, 250/368, 370.11

(56) References Cited

U.S. PATENT DOCUMENTS

| | | |
|---|---|---|
| 4,029,964 | 6/1977 | Ashe . |
| 5,132,539 | 7/1992 | Kwasnick et al. ............ 250/361 |
| 5,148,029 | 9/1992 | Persyk et al. . |
| 5,153,438 | 10/1992 | Kingsley et al. ............ 250/370.09 |
| 5,179,284 | 1/1993 | Kingsley et al. ............ 250/370.11 |
| 5,187,369 | 2/1993 | Kingsley et al. ............ 250/370.11 |
| 5,517,031 | 5/1996 | Wei et al. ............ 250/370.08 |
| 5,585,280 | 12/1996 | Kwasnick et al. ............ 437/4 |
| 5,641,984 | 6/1997 | Aftergut et al. ............ 257/433 |

FOREIGN PATENT DOCUMENTS 0147561    7/1985    (EP) .

*Primary Examiner*—Constantine Hannaher
*Assistant Examiner*—Otilia Gabor
(74) *Attorney, Agent, or Firm*—Donald S. Ingraham; Douglas E. Stoner

(57) ABSTRACT

A radiation imager includes a photosensor array that is coupled to a scintillator so as to detect optical photons generated when incident radiation is absorbed in the scintillator. The imager further includes a robust protective cover that is disposed over the scintillator to seal the scintillator from exposure to ambient moisture. The protective cover has a three panel laminate structure including a pair of first-type material panels with a second-type material panel disposed therebetween. In one embodiment, the protective cover includes a lower hermetic barrier layer, an intermediate structural layer, and upper hermetic barrier layer. The upper and lower hermetic barrier layers are of the same material; the intermediate structural layer comprises a composite material having an adhesive impregnated therein.

13 Claims, 1 Drawing Sheet

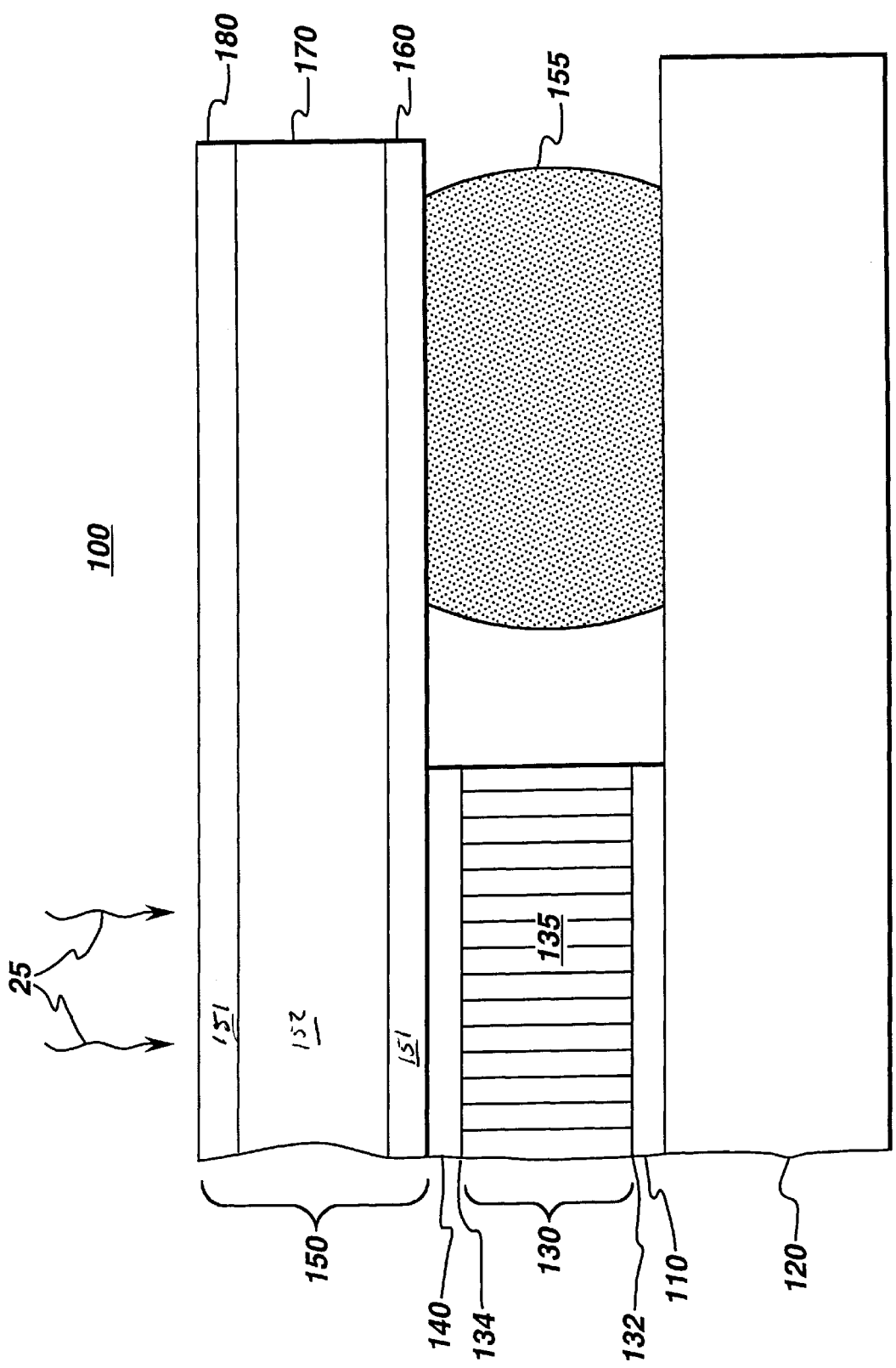

ROBUST COVER PLATE FOR RADIATION IMAGER

RELATED APPLICATIONS AND PATENTS

This invention was made with Government support under Government Contract No. MDA 972-94-30028 awarded by DARPA. The Government has certain rights in this invention.

BACKGROUND OF THE INVENTION

This invention relates generally to solid state radiation imagers and in particular to robust cover plates to enclose the imager array and protect it from adverse environmental conditions.

Solid state radiation imaging arrays typically comprise a photosensor array coupled to a scintillator. The radiation to be detected (e.g., x-rays or the like) penetrates the scintillator and is absorbed by the scintillator material in an event that results in the release of optical photons. The photosensor array coupled to the scintillator is used to detect the optical photons, providing a spatial location (x,y) in the array that corresponds with the point in the scintillator at which the incident radiation was absorbed. Readout of the photosensor array allows electrical signals to be generated that correspond to the pattern of absorbed radiation. The data embodied in such electrical signals can be presented in a visual display or otherwise processed to allow analysis of the radiation pattern.

The imager includes a glass substrate on which the photosensor array, typically comprising layers of thin films (including amorphous silicon) patterned into thin film transistors (TFT) transistors and photodiodes, is disposed. The scintillator layer typically comprises a salt, such as cesium iodide (CsI), that is deposited over the photosensor array on the substrate. The scintillator converts x-rays into visible light that is in turn detected by the photodiodes. The scintillator structure can be rapidly degraded by moisture, resulting in degraded optical performance and consequent degraded imager performance. Degradation can occur even during exposure to ambient room humidity. It is thus important that the scintillator material be protected from exposure to ambient conditions by a hermetic cover material.

The cover material for the imager array is desirably highly transmissive to x-rays. It further must be structurally robust such that it retains its form and effectiveness to provide the desired moisture resistance in a variety of environments, such as conditions (e.g., temperature extremes) that can be experienced during shipping, and conditions of prolonged use and radiation exposure. For example, the cover material must be able to retain its form and moisture resistant qualities through thermal cycling without deformation (such as delamination or deformation) that results in a breach of the moisture barrier around the scintillator. Any breach of the seal around the scintillator will result in degradation of the scintillator material and adversely affect performance of the imager. The cover material must adhere well to glues used to cement the device together and must be able to retain these desirable characteristics over the expected life and operational environment (e.g., radiation exposure) of the imager. Additionally, the cover material also is desirably readily formed in large, thin sheets required for large area imagers (e.g., about 100 cm$^2$ or greater), such as might be used for a chest x-ray system.

SUMMARY OF THE INVENTION

A radiation imager includes a photosensor array that is coupled to a scintillator so as to detect optical photons generated when incident radiation is absorbed in the scintillator. The imager further includes a robust protective cover disposed over the scintillator to seal the scintillator from exposure to moisture present in the ambient environment. The protective cover has a three panel laminate structure including a pair of first-type material panels and a second-type material panel that are laminated together such that the second-type material panel is disposed between the pair of the first-type material panels. The first-type material panels and the second-type material panels are each selected from a group consisting of a hermetic barrier layer comprising an inorganic material and a structural layer. The first-type panels and the second-type panels are different from one another.

BRIEF DESCRIPTION OF THE DRAWINGS

The sole FIGURE is a cross-sectional view of a portion of a radiation imager in accordance with one embodiment of the present invention.

DETAILED DESCRIPTION OF THE INVENTION

A solid state radiation imager 100 typically comprises a photosensor array 110 disposed over a substrate 120, as illustrated in the FIGURE. Substrate 120 comprises a structurally strong (e.g., rigid) material, such as glass or the like, to provide a foundation for the materials deposited to form photosensor array 110 and other elements of the imager. Photosensor array 110 is optically coupled to a scintillator 130 that is disposed over the photosensor array. In operation, imager 100 is positioned so that the radiation to be detected, for example x-rays 25 and the like that have passed through the object that is being imaged, is incident on scintillator 130. Incident radiation typically enters scintillator 130 and is absorbed in the scintillator material in an event resulting in the generation of optical photons. Detection by photosensor array 110 (typically an array of photodiodes) of the optical photons emitted when the incident radiation is absorbed by the scintillator material enables the generation of an electrical signal corresponding to the pattern of the incident radiation.

Scintillator 130 typically comprises a scintillating material that is a salt, such as cesium iodide or the like. A scintillator first surface 132 is disposed over photosensor array 110 so as to be optically coupled to the array to enable the passage of optical photons from the scintillator to the photosensor array 110. As used herein, "over", "above", "under" and the like are used to refer to the relative location of elements of imager 100 as illustrated in the FIGURE and is not meant to be a limitation in any manner with respect to the orientation or operation of imager 100. Most salts that are scintillator materials are sensitive to moisture absorption and will structurally and optically degrade when exposed to moisture.

In one embodiment of the present invention, scintillator 130 comprises a plurality columnar structures 135 that aid in the spatial localization of optical photons generated in the scintillator. In alternative embodiments, scintillator 130 may comprise a block of scintillator material or the like. An optical reflective layer 140 is typically (but not necessarily) disposed over scintillator second surface 134; this optical reflective layer serves to reflect optical photons generated within the scintillator back into the scintillator towards scintillator first surface 132 so that the photons can be detected by photosensor array 110. Reflective layer 140 typically comprises a compliant (e.g., deformable to conform to the columnar protrusions) material that is relatively transparent to x-rays but optically reflective. One example is the material having the trade name "Opticlad (which is a pressure sensitive adhesive-metal-polymer covering that has a light reflective surface and is transmissive of x-rays."

In accordance with the present invention, a protective cover 150 is disposed over scintillator 130. Protective cover 150 is disposed to provide a seal over second surface 134 of scintillator 130 to protect the scintillator from exposure to ambient conditions, such as moisture in the air. Protective cover 150 typically is relatively transparent to x-rays (e.g., having a transmission of greater than about 50% for the x-rays in the energy range commonly used for the imaging procedure). The protective cover is secured to the imager by means of an adhesive bead 155, such as epoxy or the like, which is disposed on substrate 120, typically as a bead of adhesive along the edge of the substrate so as to surrounding photosensor array 110). Adhesive bead 155 typically has a thickness (between substrate 120 and cover plate 150) about 0.5 mm and respective a width (along the axis of contact with surfaces of substrate and 120 and cover plate 150) of about 3 mm. Substrate 120, bonded to cover plate 150 by adhesive 155, provides a moisture resistant sealed chamber surrounding photosensor array 110 and scintillator 130, providing protection to these components from ambient environmental conditions.

Protective cover 150 has a laminate structure (that is, comprises multiple layers of material bonded together to form a single workpiece) that comprises a pair of first-type material panels 151 and a second-type material panel 152 that are laminated together such that second-type material panel 152 is disposed between the pair of first-type material panels 151. As used herein, "first-type material panel" refers to a structure having of at least the desired area of the protective cover that is comprises a particular type of material; "second-type material panel" refers to a structure of similar size (to that of the first-type material panel) that comprises a different material than the first-type material panel. The "pair" of first-type material panels refers to two panels of similar dimensions, both of which comprise the first-type material.

The first-type material panels comprise a hermetic barrier layer comprising an inorganic material, or alternatively, a structural layer that comprises an organic material, or alternatively an inorganic material, or alternatively a composite material. Similarly, the second-type material panels comprise a hermetic barrier layer comprising an inorganic material, or alternatively a structural layer that comprises an organic material, or alternatively an inorganic material, or alternatively a composite material. The protective cover thus has a pair of first-type material panels of one material (either the hermetic barrier layer or the structural layer) that are separated from one another by the second-type material panel in the laminate structure, providing a structure with alternating layer types. The second-type material layer is either the hermetic barrier layer or the structural layer, whichever is different from the material comprising the pair of first-type material panels. For example, in one embodiment, first-type material panels 151 comprise hermetic barrier layers and second-type material panels comprise the structural layer. In an alternative embodiment, first-type material layer panels comprise the structural layer and the second-type material panel comprises the hermetic barrier layer.

The three-panel laminate structure of protective cover 150 typically comprises a pair of hermetic barrier layers with a structural layer disposed therebetween as the intermediate layer in the laminate structure. By way of example, and not limitation, this embodiment of the invention is described in greater detail below to illustrate the three panel laminate protective cover 150.

Cover 150 comprises a lower hermetic barrier layer 160; an intermediate structural layer 170; and an upper hermetic barrier layer 180; upper hermetic barrier layer 180 and lower hermetic barrier layer 160 are bonded to opposite sides of intermediate structural layer 170 as illustrated in the FIGURE. As used herein, "hermetic barrier layer" refers to the characteristic of the barrier layer that makes it essentially air tight such that moisture in the ambient air is prevented from passing across the barrier. "Structural layer," as used herein, refers to a layer that provides structural strength to the cover plate, that is, it provides support to the cover plate so that it is resistant to punctures or tears during handling and manufacture. Typically the structural layer dominates the coefficient of thermal expansion of the hermetic barrier layers.

Upper hermetic barrier layer 180 and lower hermetic barrier layer 160 comprise the same hermetic barrier layer material. Use of the same material for upper and lower hermetic barrier layers provides a means for ensuring that cover plate 150 retains its shape during temperature excursions, as the upper and lower hermetic barrier layers will have the same thermal coefficient of expansion and balance any tendency towards warping that may result from a structure having only one hermetic barrier layer bonded to the dissimilar material of intermediate structural layer 170.

Warping of cover 150 when in place in imager 100 is further limited by intermediate structural layer 170 comprising a material that is compatible with the substrate material so as to avoid warping when exposed to a range of temperatures. Such compatibility to avoid warping can be achieved when the structural layer material has a thermal coefficient of expansion that is within a range of between about 20% and 500% of the substrate material; desirably the intermediate structural layer has a thermal coefficient of expansion that is closely matched with the thermal coefficient of expansion of the material from which substrate 120 is formed. For example, Corning 1737 glass, commonly used as a material for substrate 120, has a thermal coefficient of expansion of about 3.4 ppm/° C.; the graphite composite material commonly used as an intermediate structural layer material has a coefficient of expansion of about 2.3 ppm/° C. Such a match in respective thermal coefficients of expansion (e.g., a difference of about 1 ppm/° C.) make the material very compatible for use as a cover assembly that is resistant to warping.

The hermetic barrier layer material desirably exhibits good hermeticity (such as a metal) and a high transmission for x-rays, (e.g., a transmission of x-rays through the material greater than about 50% of the incident x-ray flux, and typically greater than about 75% of the incident flux, and desirably greater than about 95%). Hermetic barrier layer material further desirably exhibits good adhesion with adhesive 155 that is used to secure cover plate 150 to substrate 110 as typically the primary contact between adhesive 155 and cover plate 150 is at the lower hermetic barrier layer 160, as illustrated in the FIGURE. For example, it is known in the art that epoxy forms a more rugged and durable bond with a material such as aluminum than with a material such as graphite. Examples of hermetic barrier layer materials that are well adapted for use in cover plate 150 include metal foils of low Z (that is, having an atomic number less than about 30, such as aluminum (Z=13), titanium (Z=22), nickel (Z=28), or copper (Z=29)). Hermetic barrier layers 160 and 180 typically are relatively thin, having a thickness in the range between about 10 μm and 250 μm, and commonly in the range between about 25 μm and about 50 μm. Upper and lower hermetic barrier layers 160 and 180 made of aluminum, for example, typically each have a thickness of about 25 μm.

Intermediate structural layer 170 typically comprises a composite material having an adhesive impregnated therein. Structural layer 170 typically comprises a graphite composite material that exhibits good bonding with the hermetic barrier layer material. It has been found that graphite (in a non-composite form) does not exhibit good bonding to an adhesive such as epoxy during the course of thermal cycling (for example, cycles in a range between about −40 degrees C to +85 degrees C), resulting in delamination of the cover plate structure. The graphite composite material typically comprises at least one layer of graphite fibers with a resin impregnated throughout the layer that adheres to the graphite fibers. It is thought that the superior bond strength apparent in the use of graphite composite material results from the bond with the hermetic barrier layer material being formed by the same resin of the composite material that is distributed throughout the composite material. The dispersion of this resin throughout the material and around the graphite fibers appears to provide a more rugged bond than the bond formed by a separate epoxy material being applied between the hermetic barrier layer material and graphite without the resin impregnated in the layer.

In one embodiment of the present invention, the structural layer is formed from a graphite building material such as "Prepreg," which is a trade name for the material. This material is typically made for the aerospace industry and is available from suppliers such as Hexcel or Fortafil Fibers Inc. of Rockwood Tenn. The structural layer comprises a plurality of non-woven sheets of the Pregreg graphite that have graphite fibers of about 5 mil diameter and that are formed into a sheet of material held together by the adhesive resin and layered into a composite (as is available from General Composites, Inc. of Westport, N.Y.). The layers of the graphite sheet are laminated together in a heated press to form structural layer 170; the adhesive resin material is impregnated throughout the sheets of graphite (that is, distributed throughout the material to form an integral part of the composite structure). The various sheets of graphite composite are stacked with the respective sheet graphite fiber axes offset from one another (e.g., by about 60 degrees between adjacent sheets) to provide a quasi isotropic coefficient of expansion for the laminate (the thermal coefficient of expansion being much higher in the direction of the graphite fiber axis than in a direction perpendicular to that axis).

Sufficient layers of graphite sheet are laminated together to form structural layer 170 having the desired anisotropy. The thickness of structural layer is typically in the range between about 0.5 mm and about 1 mm. For example, in one embodiment of the invention, structural layer 170 comprises six sheets of graphite sheets laminated together (providing acceptable isotropic structural stability during heating), and having a total structural layer thickness of about 0.84 mm.

Typically the cover plate laminate structure of upper and lower hermetic barrier layers 160, 180 and intermediate structural layer 170 is formed coincidentally (in a process referred to as "coconsolidations") with the lamination of graphite composite sheets to form intermediate structural layer 170, with the hermetic barrier layer material being heated simultaneously in the press, allowing the adhesive resin binding the graphite composite sheets together to form the adhesive bond to the upper and lower hermetic barrier layers.

The cover plate in accordance with this invention is well adapted for fabrication in different sizes so that the cover can be used with a variety of imager array sizes, from small (e.g., about 0.1 cm$^2$) to large (e.g., about 10,000 cm$^2$).

Tests conducted on cover plate 150 fabricated in accordance with this invention demonstrate that the plate is structurally robust, showing no indication of delamination after 17 thermal cycles (ranging between −40 degrees C and +85 degrees C). Additionally, the epoxy seal remains bonded to the aluminum lower hermetic barrier layer of the cover plate after hundreds of hours of exposure to conditions of 85° C. and 85% relative humidity.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A robust solid state radiation imager assembly comprising:

a photosensor array disposed on a substrate;

a scintillator having a first surface and a second surface, said scintillator being disposed over said photosensor array such that the scintillator first surface is optically coupled to said photosensor array; and a robust protective cover disposed over the scintillator second surface to seal said scintillator second surface from exposure to moisture present in the ambient environment;

said protective cover having a three panel laminate structure comprising a pair of first-type material panels and a second-type material panel that are laminated together such that said second type material panel is disposed between said pair of first type material panels in said three panel laminate structure;

said first type material panels and said second type material panels each being selected from the group consisting of a hermetic barrier layer comprising an inorganic material and a structural layer;

said first-type material panels and said second-type material panels comprising materials that are different than one another;

said structural layer comprising a composite material;

each of said structural layers exhibiting a coefficient of expansion that is within about 20% to about 500% of the coefficient of expansion of said substrate.

2. The imager of claim 1 wherein each panel in said pair of first-type material panels comprise a hermetic barrier layer and said second-type material panel comprises a structural layer;

said panels being disposed in said laminate structure such that said hermetic barrier layers are bonded to opposite sides of said structural layer.

3. The imager of claim 1 wherein each panel in said pair of first-type material panels comprise a structural layer and said second-type material panel comprises a hermetic barrier layer;

said panels being disposed in said laminate structure such that said structural layers are bonded to opposite sides of said hermetic barrier layer.

4. The imager of claim 1 wherein said said composite material of said structural layer has an adhesive impregnated therein.

5. The imager of claim 1 wherein each of said hermetic barrier layers has an effective x-ray transmission in the range between about 50% and about 100%.

6. The imager of claim 5 wherein hermetic barrier layer comprises a material having an atomic number less than 30.

7. The imager of claim 6 wherein each of said hermetic barrier layers comprise a material selected from the group consisting of aluminum, titanium, nickel, and copper.

8. The imager of claim 1 wherein each of said hermetic barrier layers has a thickness in the range between about 25 $\mu$m and about 250 $\mu$m.

9. The imager of claim 1 wherein said protective cover has a surface area in the range between about 0.1 cm$^2$ and about 10,000 cm$^2$.

10. The imager of claim 1 wherein each of said structural layers comprises a composite material.

11. The imager of claim 10 wherein each of said structural layers comprises graphite composite material having a resin impregnated around a plurality of graphite fibers, said resin providing an adhesive for bonding the protective cover laminate together.

12. The imager of claim 1 wherein each of said structural layer has a thickness in the range between about 0.5 mm and about 1 mm.

13. The imager of claim 1 wherein said scintillator comprises cesium iodide.

* * * * *